US012636532B2

(12) United States Patent
Schlepp

(10) Patent No.: US 12,636,532 B2
(45) Date of Patent: May 26, 2026

(54) ADDING SYSTEM FOR FIRE-EXTINGUISHING UNITS

(71) Applicant: FIREDOS GMBH, Wölfersheim (DE)

(72) Inventor: Alexander Schlepp, Buseck (DE)

(73) Assignee: FIREDOS GMBH (DE)

( * ) Notice: Subject to any disclaimer, the term of this patent is extended or adjusted under 35 U.S.C. 154(b) by 567 days.

(21) Appl. No.: 17/762,229

(22) PCT Filed: Nov. 2, 2020

(86) PCT No.: PCT/EP2020/080632
§ 371 (c)(1),
(2) Date: Mar. 21, 2022

(87) PCT Pub. No.: WO2021/089456
PCT Pub. Date: May 14, 2021

(65) Prior Publication Data

US 2022/0339480 A1 Oct. 27, 2022

(30) Foreign Application Priority Data

Nov. 5, 2019 (DE) ........................ 202019004525.2

(51) Int. Cl.
*A62C 35/68* (2006.01)
*A62C 5/00* (2006.01)
(Continued)

(52) U.S. Cl.
CPC .............. *A62C 35/68* (2013.01); *A62C 5/002* (2013.01); *A62C 99/0036* (2013.01); *F04B 9/10* (2013.01); *F04B 9/109* (2013.01); *F04C 2/344* (2013.01)

(58) Field of Classification Search
CPC ....... A62C 35/68; A62C 99/0036; A62C 5/02; A62C 5/002; B01F 23/451; B01F 35/831;
(Continued)

(56) References Cited

U.S. PATENT DOCUMENTS

| | | | |
|---|---|---|---|
| 1,795,749 | A | 3/1931 | Winters |
| 2,347,944 | A | 5/1944 | Fowler |

(Continued)

FOREIGN PATENT DOCUMENTS

| | | |
|---|---|---|
| CN | 85105455 | 1/1987 |
| CN | 204275631 | 4/2015 |

(Continued)

OTHER PUBLICATIONS

Gao Jiaquan "The Structure and Overhaul of Automobile Engine," Beijing Institute of Technology Press, Jul. 2013, p. 153.

(Continued)

*Primary Examiner* — Dominick L Plakkoottam
(74) *Attorney, Agent, or Firm* — Sheridan Ross P.C.

(57) ABSTRACT

An adding system for fire-extinguishing units is disclosed for producing a mixture of extinguishing agent and extinguishing agent additive (premix) by adding an extinguishing agent additive, e.g., a foaming agent, to an extinguishing agent, e.g., water, the adding system comprising a motor, which can be driven by the extinguishing agent stream, an adding pump, which can be driven by the motor, an adding line, and an extinguishing agent additive line. The invention increases the operational reliability of an adding system for fire-extinguishing units by the outer wall of the working chamber of the motor being in the form of a rotation motor, which can also have the shape of a logarithmic spiral. Furthermore, the wall of the drainage housing of the motor, which is in the form of a rotation motor, can have a through-slot for letting the extinguishing agent in and/or out. Moreover, the inlet of the adding pump can be arranged such that the extinguishing agent additive can flow into the adding pump substantially parallel to the movement direction of the pistons of the adding pump. Finally, the adding pump can have an integrated relief valve.

2 Claims, 3 Drawing Sheets

Figure 1:
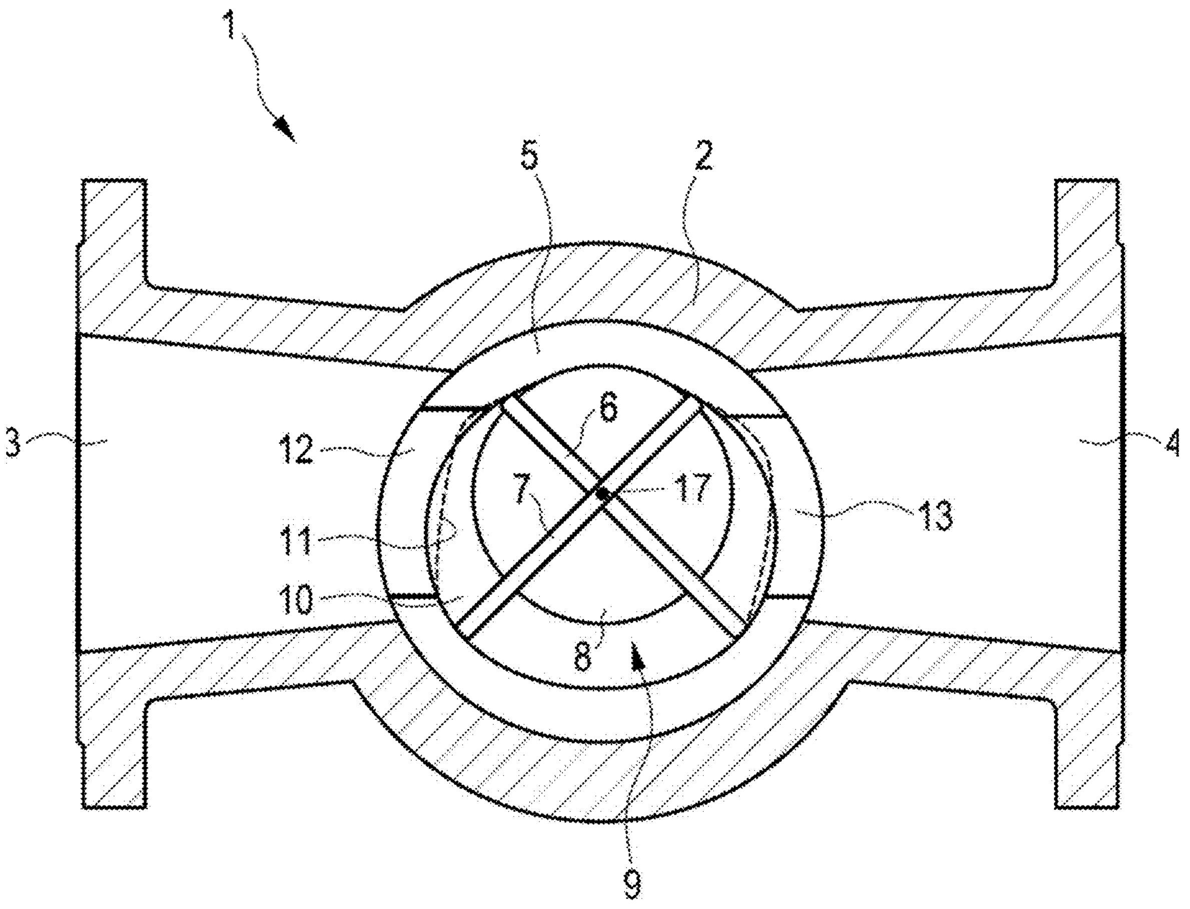

(51) Int. Cl.

| | |
|---|---|
| ***A62C 99/00*** | (2010.01) |
| ***F04B 9/10*** | (2006.01) |
| ***F04B 9/109*** | (2006.01) |
| ***F04C 2/344*** | (2006.01) |

(58) Field of Classification Search
CPC .. F04B 9/10; F04B 17/00; F04B 9/109; F04C 2250/301; F04C 2/344; F03C 2/304
See application file for complete search history.

(56) References Cited

U.S. PATENT DOCUMENTS

| | | | | |
|---|---|---|---|---|
| 2,491,351 A | | 12/1949 | Zeitllin | |
| 3,814,547 A | | 6/1974 | Kitrilakis et al. | |
| 3,903,968 A | | 9/1975 | Livingston | |
| 4,257,440 A | | 3/1981 | Hunter | |
| 4,436,487 A | | 3/1984 | Purvis | |
| 4,645,009 A | * | 2/1987 | Hawelka | A62C 5/008 137/895 |
| 4,830,589 A | | 5/1989 | Pareja | |
| 4,859,157 A | | 8/1989 | Adler | |
| 4,899,825 A | | 2/1990 | Bosoni et al. | |
| 5,174,383 A | | 12/1992 | Haugen | |
| 5,295,880 A | | 3/1994 | Parker | |
| 5,402,569 A | * | 4/1995 | Maki | F01C 21/106 29/888.025 |
| 5,979,564 A | | 11/1999 | Crabtree | |
| 6,009,953 A | * | 1/2000 | Laskaris | A62C 5/02 169/15 |
| 6,074,176 A | | 6/2000 | Conkin | |
| 6,085,586 A | | 7/2000 | Arvidson et al. | |
| 6,684,959 B1 | | 2/2004 | Juidici et al. | |
| 6,725,940 B1 | | 4/2004 | Klein | |
| 7,563,076 B2 | | 7/2009 | Brunet | |
| 8,789,614 B2 | | 7/2014 | Hosfield | |
| 2003/0196703 A1 | | 10/2003 | Decler et al. | |
| 2004/0050556 A1 | | 3/2004 | Baker | |
| 2005/0023006 A1 | | 2/2005 | Vonhof | |
| 2006/0180321 A1 | | 8/2006 | Yoshida | |
| 2007/0209807 A1 | | 9/2007 | Kruger | |
| 2010/0193201 A1 | | 8/2010 | Zeller | |
| 2011/0056707 A1 | * | 3/2011 | Gamble | H02P 3/00 318/473 |
| 2012/0241029 A1 | | 9/2012 | Carollo | |
| 2013/0048099 A1 | * | 2/2013 | Crabtree | F03C 2/304 137/98 |
| 2013/0253711 A1 | | 9/2013 | McLoughlin et al. | |
| 2014/0369873 A1 | * | 12/2014 | Bassine | F04B 9/047 417/537 |
| 2016/0237843 A1 | | 8/2016 | Manicone | |
| 2016/0348471 A1 | | 12/2016 | Kenney et al. | |
| 2018/0272164 A1 | * | 9/2018 | Knight | A62C 5/02 |
| 2019/0168047 A1 | | 6/2019 | Conboy | |
| 2019/0219051 A1 | | 7/2019 | Kraige et al. | |
| 2019/0229582 A1 | | 7/2019 | Ito et al. | |
| 2019/0262637 A1 | | 8/2019 | Statter | |
| 2019/0374800 A1 | | 12/2019 | Sivertsen | |
| 2020/0230450 A1 | | 7/2020 | Jonker | |
| 2021/0346740 A1 | | 11/2021 | Jiang et al. | |
| 2022/0072351 A1 | | 3/2022 | Jungmair | |
| 2025/0065167 A1 | | 2/2025 | Schlepp | |
| 2025/0065168 A1 | | 2/2025 | Schlepp | |
| 2025/0065169 A1 | | 2/2025 | Schlepp | |

FOREIGN PATENT DOCUMENTS

| | | | | |
|---|---|---|---|---|
| CN | 205626812 | | 10/2016 | |
| CN | 106468252 | | 3/2017 | |
| CN | 107349545 | | 11/2017 | |
| CN | 107376177 | | 11/2017 | |
| CN | 207970383 | | 10/2018 | |
| CN | 109513140 | | 3/2019 | |
| CN | 208871102 | | 5/2019 | |
| CN | 110087741 | | 8/2019 | |
| CN | 211636052 | | 10/2020 | |
| DE | 806184 | | 6/1951 | |
| DE | 3131522 | | 4/1983 | |
| DE | 3503788 | | 2/1986 | |
| DE | 3812794 | | 10/1989 | |
| DE | 4227037 | | 2/1994 | |
| DE | 102008059638 | | 6/2010 | |
| DE | 102019215406 | | 4/2021 | |
| EP | 0296652 | | 12/1988 | |
| EP | 0647458 | | 4/1995 | |
| EP | 1595579 | | 4/2010 | |
| EP | 3292886 | | 3/2018 | |
| GB | 196608 | | 2/1924 | |
| GB | 731102 | | 6/1955 | |
| GB | 2375301 | | 11/2002 | |
| IT | MI20091679 | | 4/2011 | |
| KR | 20-0378222 | | 3/2005 | |
| KR | 10-2018-0052462 | | 5/2018 | |
| RU | 2257527 | | 7/2005 | |
| RU | 2431061 | | 10/2011 | |
| RU | 2530059 | | 10/2014 | |
| RU | 195411 | | 1/2020 | |
| SU | 41351 | | 1/1935 | |
| WO | WO 2006/000177 | | 1/2006 | |
| WO | WO 2006/119923 | | 11/2006 | |
| WO | WO-2007140758 A1 | * | 12/2007 | F04C 2/3442 |
| WO | WO-2011128707 A2 | * | 10/2011 | F01C 21/106 |
| WO | WO 2016/048136 | | 3/2016 | |
| WO | WO 2017/123957 | | 7/2017 | |
| WO | WO-2018077811 A1 | * | 5/2018 | |

OTHER PUBLICATIONS

Official Action with English Translation for China Patent Application No. 202080075912.9, dated Nov. 29, 2022, 24 pages.
Official Action with Machine Translation for Russia Patent Application No. 2022114448/03, dated Dec. 16, 2022, 11 pages.
U.S. Appl. No. 17/767,310, filed Apr. 7, 2022, Hulinsky et al.
U.S. Appl. No. 17/767,327, filed Apr. 7, 2022, Hulinsky et al.
D Roos "Data Sheet Proportioner FD20000 for Stationary Extinguishing Systems," FireDos GmbH, Sep. 2018, 4 pages [retrieved online Jan. 13, 2021 from: www.firedos.com/downloads/en/DATA-sHEET-FireDos_FD20000-stationary.pdf].
Extended Search Report with Machine Translation for European Patent Application No. 2416435.1, dated Jul. 11, 2024, 10 pages.
Extended Search Report with Machine Translation for European Patent Application No. 24164350.1, dated Jul. 10, 2024, 9 pages.
Extended Search Report with Machine Translation for European Patent Application No. 24164352.7, dated Jul. 10, 2024, 9 pages.
International Search Report and Written Opinion for International (PCT) Patent Application No. PCT/EP2020/080632, dated May 27, 2021, 22 pages.
English Translation of the International Search Report for International (PCT) Patent Application No. PCT/EP2020/080632, dated May 27, 2021, 4 pages.
Official Action for U.S. Appl. No. 18/941,982, dated Aug. 6, 2025 8 pages.
Official Action for U.S. Appl. No. 18/942,008, dated Aug. 18, 2025 9 pages.
Official Action for U.S. Appl. No. 18/942,016, dated Aug. 14, 2025 9 pages.
Official Action for U.S. Appl. No. 18/941,982, dated Feb. 23, 2026 8 pages.
Official Action for U.S. Appl. No. 18/942,004, dated Feb. 23, 2026 8 pages.
Official Action for U.S. Appl. No. 18/942,016, dated Feb. 23, 2026 8 pages.

* cited by examiner

ADDING SYSTEM FOR FIRE-EXTINGUISHING UNITS

CROSS REFERENCE TO RELATED APPLICATIONS

This application is a national stage application under 35 U.S.C. 371 and claims the benefit of PCT Application No. PCT/EP2020/080632 having an international filing date of 2 Nov. 2020, which designated the United States, which PCT application claimed the benefit of German Patent Application No. 202019004525.2 filed 5 Nov. 2019, the disclosures of each of which are incorporated herein by reference in their entireties.

The present invention relates to an adding system for fire-extinguishing units. A fire-extinguishing unit in the sense of the present invention is a system comprising a pump, a system of lines, and a foaming agent adding system by means of which an extinguishing agent can be discharged, in particular through nozzles, foam tubes or foam generators. The fire-extinguishing unit can be a stationary system such as a fire-extinguishing unit in a tank farm having a permanently installed so-called monitor; i.e. a large jet nozzle, or even a permanently mounted sprinkler system in a building. It can however also be a portable system on a vehicle or a roll-on/roll-off container.

Such fire-extinguishing units are usually operated with water as the extinguishing agent. Yet it is advantageous in many cases for the extinguishing agent to be foamed before being deployed onto the fire to be fought so that the extinguishing agent applied forms a long-lasting blanket of extinguishing agent able to smother the fire. To that end, an extinguishing agent additive, a foaming agent in this case, is usually first mixed into the extinguishing agent at a specific rate. The mixture of extinguishing agent/extinguishing agent additive (the so-called “premix”) is then foamed in a nozzle under a feed of air and discharged onto the fire to be extinguished. The volumetric ratio of extinguishing agent additive to extinguishing agent, the so-called admixture rate, is typically between 0.5% and 6%.

Another extinguishing agent additive able to be mixed with the extinguishing agent is a surfactant or “wetting agent” which reduces the surface tension of the extinguishing agent, in particular the extinguishing water. This is advantageous when fighting forest fires, for example, because the extinguishing water can thereby bathe larger areas, particularly on the leaves of trees, and can thus be used more efficiently. Furthermore, due to the reduced surface tension, the extinguishing water can penetrate deeper into the forest soil in order to extinguish deeper hotspots, for example.

There are also foaming agents likewise able to be used as wetting agents (potentially at other admixture rates, particularly at a minimum admixture rate of 0.1%).

The invention will to some extent be described in the following using the example of water as an extinguishing agent and foaming agent as an extinguishing agent additive. However, this is not to be understood as being limiting. The invention can just as equally be used in the adding of any extinguishing agent additives to any extinguishing agents.

For operation of the fire-extinguishing unit with the adding system, both the extinguishing agent as well as the extinguishing agent additive can be provided in an extinguishing agent tank, or an extinguishing agent additive tank respectively, or also provided via an extinguishing agent supply line or extinguishing agent additive supply line respectively. Further necessitated when the extinguishing agent is provided in an extinguishing agent tank is an extinguishing agent pump which pumps the extinguishing agent out of the extinguishing agent tank, pressurizes it and feeds it to the adding system. The just mentioned components are not, however, part of the adding system itself.

When the extinguishing agent additive is a foaming agent, the mixture of extinguishing agent and extinguishing agent additive to be produced; i.e. the premix, is then directed as a premix flow through a foaming nozzle in which ambient air is drawn in via the premix flow and mixed with the premix. This activates the foaming agent in the premix and foams the premix such that an extinguishing agent foam can be discharged from the foaming nozzle and deployed onto the fire.

The air needed to foam the foaming agent can also be supplied to the premix in the form of compressed air. Such a unit generating compressed air foam is referred to as a OAFS system (compressed air foam system).

Although it is possible for the premix to be produced in advance independently of the fire-extinguishing unit, it might then need to be stored for a longer period of time. Thus, in many cases, it is more advantageous to not produce the premix until right before the extinguishing agent being spread onto the fire to be fought. The adding system has an adding pump for this purpose, via which the extinguishing agent additive can be conveyed and added into the extinguishing agent.

In the adding system relative to the present invention, the adding pump is driven by a motor which is in turn itself driven by a flow of the extinguishing agent.

In the above-cited, non-limiting example of invention application, the adding system thus comprises a water motor driven by the extinguishing water flow. The output shaft of the water motor is coupled to the input shaft of the adding pump to that end, for example by means of a clutch.

The extinguishing agent additive conveyed by the adding pump is then directed through an extinguishing agent additive line from the adding pump into an adding line and mixed into the flow of extinguishing agent there in order to produce the premix.

This configuration of the adding system, in which the adding pump is driven by the already present flow of extinguishing agent, has the advantage of the adding pump not needing any external operating energy, particularly electricity, whereby the adding system is extremely fail-safe. Furthermore, the conveying capacity of the adding pump is substantially proportional to the speed of the motor, which is in turn substantially proportional to the flow rate of the extinguishing agent flow. A substantially constant admixture rate is thereby achieved automatically without the need for further control or regulating devices.

In an adding system for fire-extinguishing units having the structure as described above, the problem arises of the components of the adding system vibrating during operation and thereby being subjected to mechanical loads, which in extreme cases can lead to cracks and accompanying leakage. This thus results in reduced operational reliability of the adding system.

A further problem with such an adding system is that certain media used for its operation, in particular extinguishing agent additives of high viscosity, occasion high flow resistance in the components of the adding system. This leads to the media needing to be put under high pressure in order to overcome the cited flow resistance, which in turn stresses the adding system components even more and, in so doing, negatively affects the adding system's operational reliability. At the same time, high flow resistance also reduces the adding system's efficiency.

An additionally occurring problem with such an adding system is that individual components, in particular the adding pump, can be subject to excessively high extinguishing agent, extinguishing agent additive and/or premix pressure and can thereby be damaged or even destroyed. This also jeopardizes the operational reliability of the adding system.

The invention is therefore based on the task of increasing operational reliability in an adding system for fire-extinguishing units of the above-described structure.

This task is solved by an adding system according to the claims.

The invention is based on an adding system for fire-extinguishing units for adding an extinguishing agent additive, in particular a foaming agent, to an extinguishing agent, in particular water.

The adding system has a motor, in particular a water motor, able to be driven by a flow of extinguishing agent with an input for supplying the extinguishing agent to the motor, in particular from an extinguishing agent tank or from an extinguishing agent supply line, an output for discharging the extinguishing agent from the motor, and an output shaft able to be driven by the motor.

The adding system further comprises an adding pump, in particular a piston pump, for conveying the extinguishing agent additive which has an input shaft coupled to the output shaft of the motor, an inlet for providing the extinguishing agent additive, in particular from an extinguishing agent additive tank or from an extinguishing agent additive supply line, and an outlet for discharging the extinguishing agent additive.

The adding system further comprises an adding line having a first motor-side end and a second outlet-side end, wherein the motor-side end is fluidly connected to the output of the motor.

In addition, the adding system comprises an extinguishing agent additive line having a first pump-side end and a second adding line-side end, wherein the pump-side end is fluidly connected to the outlet of the adding pump and the adding line-side end is fluidly connected to the adding line at an admixture point.

According to a first aspect of the invention, the motor is a rotation motor in which a rotor is rotatably mounted such that it at least temporarily comes into contact with an outer wall of a working chamber of the motor during its rotation.

According to the invention, an outer wall of the working chamber is thereby at least partially in substantially the shape of a logarithmic spiral in a cross section perpendicular to an axis of rotation of the rotor.

The rotation motor is preferably a water motor functioning according to the displacement principle, in which the rotor is of multi-part design and comprises a rotor body as well as a plurality of radially displaceable vanes (so-called paddles). The radial displacement of the paddles with each revolution of the motor results in a high frequency back and forth movement of the paddles. In conventional water motors, this can lead to vibrations and irregular operation of the water motor. The water motor can thereby be mechanically stressed, which negatively impacts its service life and its operational reliability.

It has been shown that the smooth operation of the water motor can be improved when the radially outer ends of the paddles at least partially define a trajectory in the form of a logarithmic spiral during their movement.

In the usual mathematical sense, a logarithmic spiral is understood as a spiral in which the distance from its center changes by the same factor with each rotation of the spiral. A logarithmic spiral can be depicted in polar coordinate form by the equation $$r(\varphi)=ae^{k\varphi},$$

wherein φ is the angle of rotation of a point on the spiral and r(φ) is the respective radius of the point. The parameter k is furthermore the pitch of the spiral and a is another scaling factor.

Since the trajectory of the radially outer ends of the paddles is dictated by their contact with the outer wall of the water motor's working chamber, the cross section of the working chamber perpendicular to an axis of rotation of the rotor is also inventively designed at least partially in substantially the form of a logarithmic spiral.

Due to the lower mechanical load on the water motor, the operational reliability of the adding system is thusly improved.

According to a second aspect of the invention, the motor is a rotation motor in which a rotor is rotatably mounted in a drainage housing.

The wall of the drainage housing inventively comprises at least one through slot, in particular at least one through slot extending substantially in a plane perpendicular to an axis of rotation of the rotor, for the inlet of the extinguishing agent into the drainage housing and/or for the outlet of the extinguishing agent out of the drainage housing.

So that the extinguishing agent can enter into the drainage housing in order to drive the rotor there and then exit out of the drainage housing again, the wall of the drainage housing cannot be closed but instead must have at least one opening through which the extinguishing agent can flow.

The invention therefore provides for at least one through slot in the wall of the drainage housing. It preferably runs substantially in a plane perpendicular to an axis of rotation of the rotor in order to create the lowest possible flow resistance for the extinguishing agent. Further preferably, two, three or more through slots, in particular a plurality of through slots, are arranged in the wall of the drainage housing.

A through slot is hereby to be understood in the usual meaning as an elongated, in particular straight opening which completely penetrates through a surface, in this case the wall of the drainage housing, and thus creates an opening from one side of the surface to the other side of the surface.

Through slots in the drainage housing wall in particular make for lower flow resistance to the extinguishing agent than do e.g. through holes in the drainage housing wall as are used in conventional motors having the structure as considered in the present case.

Providing through slots in the wall of the drainage housing results in reducing the loss in extinguishing agent pressure during motor operation and reducing wear and tear on the motor. This thus also increases the operational reliability of the adding system.

According to a third aspect of the invention, the adding pump is a piston pump.

According to the invention, the inlet of the adding pump is thereby arranged on the adding pump such that the extinguishing agent additive can flow into the adding pump substantially parallel to the direction of movement of at least one, preferably all, of the pistons of the adding pump.

This constructive measure achieves an improved intake characteristic compared to conventional, angled and often sharp-edged inner connections at the adding pump inlet, particularly in the case of high-viscosity extinguishing agent additives. In particular, the extinguishing agent additive does not need to be deflected upon entering the adding pump before flowing into the cylinders of the pistons. This significantly reduces the flow resistance to which the extinguishing agent additive is subjected at the inlet of the adding pump and the resultant pressure loss. This thereby improves the adding system's operational reliability and efficiency.

According to a fourth aspect of the invention, the adding pump has a relief valve which is integrated in particular into its pump cover. This protects the adding pump from excessive extinguishing agent additive pressure which can occur for example due to faulty infeed from an extinguishing agent additive tank or from an extinguishing agent additive supply line. Integrating the relief valve into the adding pump also reduces the package space of the adding system, particularly compared to a relief valve arrangement outside of the adding pump.

Figure 2:
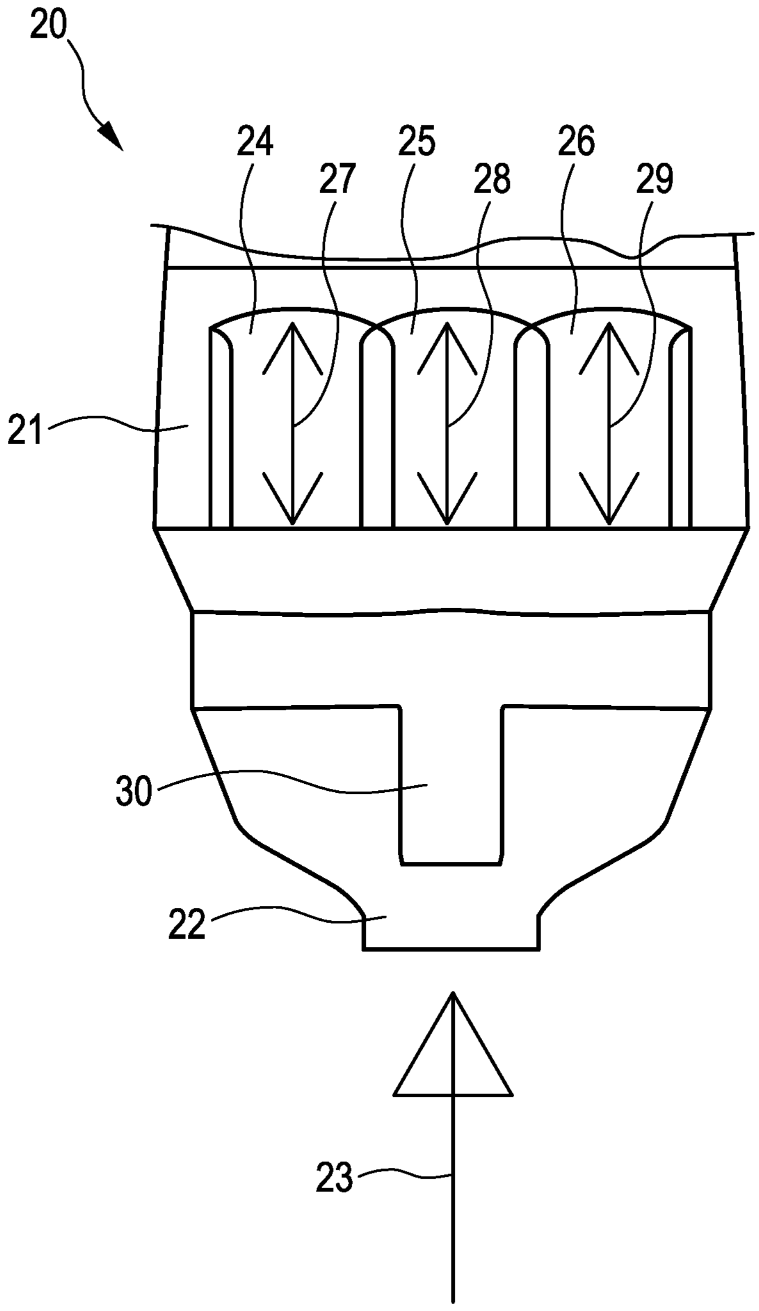

Further advantages, features and possible applications of the present invention will become apparent from the following description in conjunction with the figures. Shown are:

FIG. 1: a schematic diagram of a water motor of an adding system according to the invention in a cross section perpendicular to the axis of rotation of the rotor of the water motor;

FIG. 2: a schematic cross section through an adding pump of an adding system according to the invention.

Figure 3:
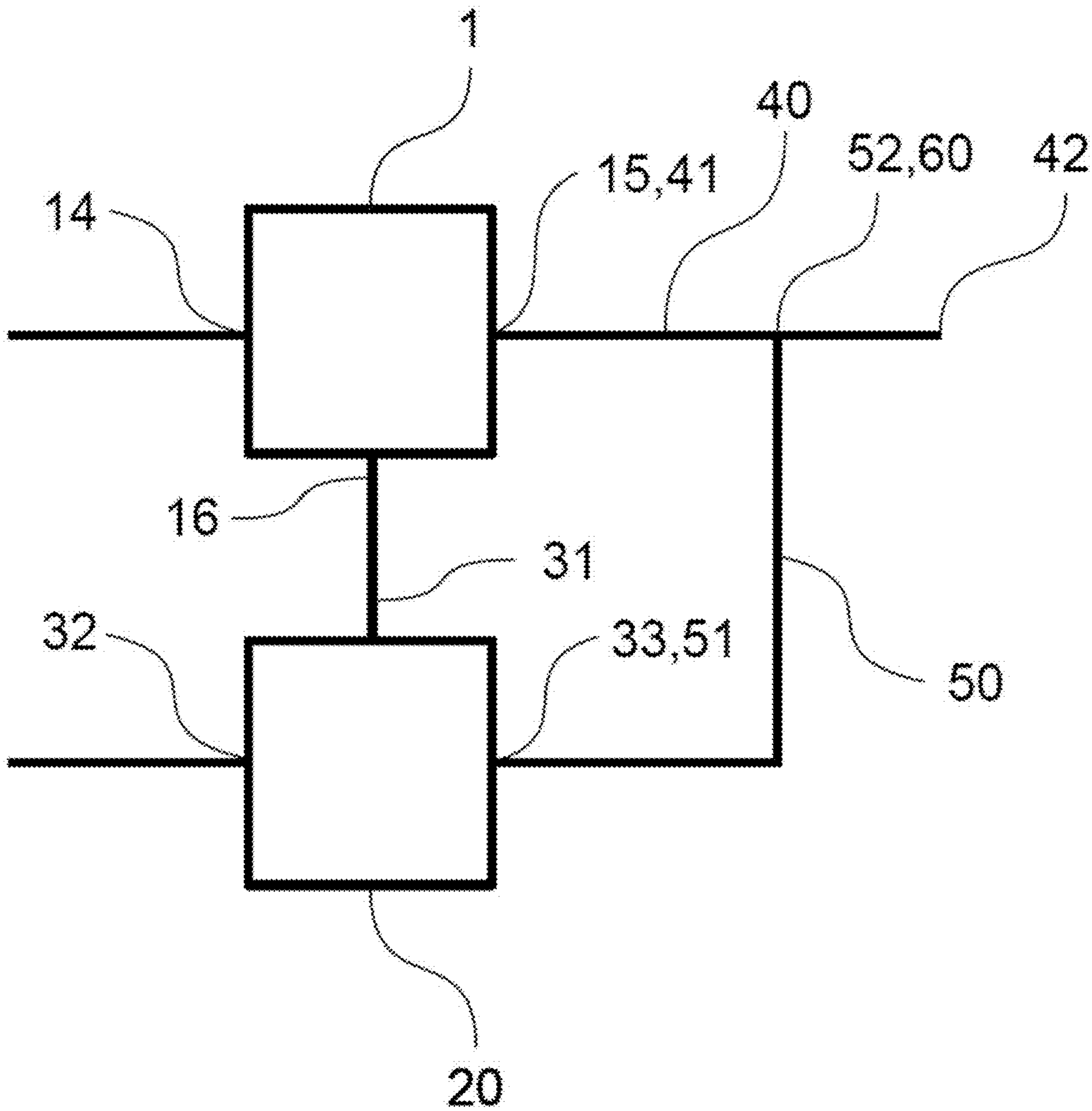

FIG. 3: a schematic diagram of an adding system according to the invention.

FIG. 3 shows an exemplary embodiment of an adding system according to the invention as a schematic diagram.

The adding system includes a water motor 1 able to be driven by a flow of an extinguishing agent, with an input 14 for supplying the extinguishing agent to the water motor 1, an output 15 for discharging the extinguishing agent from the water motor 1, and an output shaft 16 able to be driven by the water motor 1.

The adding system further includes an adding pump 20 for conveying an extinguishing agent additive which has an input shaft 31 coupled to the output shaft 16 of the water motor 1, an inlet 32 for providing the extinguishing agent additive, and an outlet 33 for discharging the extinguishing agent additive.

The adding system further includes an adding line 40 having a first motor-side end 41 and a second outlet-side end 42, wherein the first motor-side end 41 is fluidly connected to the output 15 of the water motor 1, and an extinguishing agent additive line 50 having a first pump-side end 51 and a second adding line-side end 52, wherein the first pump-side end 51 is fluidly connected to the outlet 33 of the adding pump 20 and the second adding line-side end 52 is fluidly connected to the adding line 40 at an admixture point 60.

In the exemplary embodiment of FIG. 1, the water motor 1 of an adding system according to the first and second aspects of the invention is a rotation motor which works based on the displacement principle. The water motor 1 comprises a housing 2 having a passage opening connecting an input 3 to a working chamber 10 and an output 4. The extinguishing water can thereby flow through the water motor 1 from its input 3 to the output 4 via its working chamber 10.

A tubular drainage housing 5, its exterior of cylindrical shape, is non-rotatably arranged relative to the housing 2 between the input 3 and the output 4. The axis of the cylinder runs perpendicular to the direction of flow of the water motor 1 (perpendicular to the FIG. 1 sheet plane). Through slots 12, 13 through which the extinguishing water can flow are provided in the wall of the drainage housing 5.

A rotor 9 having a cylindrical rotor body 8 rotatably mounted about an axis of rotation is arranged inside the drainage housing 5. The axis of rotation of the rotor 9 runs parallel to the axis of the drainage housing 5, albeit offset thereto, such that the rotor 9 is arranged eccentrically in the drainage housing 5.

The remaining crescent-shaped cavity between the outer wall of the rotor body 8 and inner wall 11 of the drainage housing 5 forms the working chamber 10 of the water motor 1. In particular, the outer wall of the rotor body 8 forms the inner wall of the working chamber 10 and the inner wall 11 of the drainage housing 5 forms the outer wall of the working chamber 10. In a region where the outer wall of the rotor body 8 touches the inner wall 11 of the drainage housing 5, the inner wall 11 of the drainage housing 5 is slightly "bulged" radially outwardly in the cross-sectional shape of a circular arc (at the upper edge of the rotor body 8 in FIG. 1).

The rotor 9 further comprises two vane-shaped paddles 6, 7 inserted into radial slots in the rotor body 8. The paddles 6, 7 are radially displaceable within the rotor body 8 and can protrude radially outward beyond same. The paddles 6, 7 additionally have cutouts (not shown) in their respective middle sections which ensure they do not collide with each other at their point of intersection on the rotational axis of the rotor 9.

The radial extension of the paddles 6, 7 is calculated such that both ends of each paddle 6, 7 nearly touch the inner wall 11 of the drainage housing 5, whereby the paddles 6, 7 can still move freely when the rotor 9 rotates. The paddles 6, 7 are cyclically pushed to and from in the working chamber 10 when the rotor 9 rotates due to the eccentric arrangement of the rotor 9. The paddles 6, 7 thereby form chambers of differing volumes in working chamber 10 with the outer wall of the rotor body 8 and the inner wall 11 of the drainage housing 5.

When extinguishing water flows through the water motor 1, the extinguishing water sets the rotor 9 into rotation. In doing so, an output shaft (not shown) of the water motor 1 connected to the rotor 9 is also set into rotation in order to drive an adding pump.

It has been shown that the water motor 1 does not run smoothly when the inner side 11 of the drainage housing 5—apart from the above-described "bulge"—is likewise of cylindrical shape. In this case, the sharp, axially extending edges forming at the transition between the cylindrical shape and said bulge namely occasion an impact every time an end of a paddle 6, 7 skims over them. These impacts cause vibrations and irregular operation of the water motor 1, particularly at higher water motor 1 speeds.

The inner side 11 of the drainage housing 5 is therefore designed in individual sections in the form of a logarithmic spiral, depicted with dashed lines in FIG. 1. Doing so eliminates the aforementioned sharp edges on the inside 11 of the drainage housing 5 and thus the impacts on the ends of the paddles 6, 7, which makes the water motor 1 run substantially smoother.

FIG. 2 depicts an adding pump 20 of an adding system according to the third aspect of the invention. The adding pump 20 is in the form of a piston pump having three pistons 24, 25, 26 which move up and down parallel to one another in a respective cylinder (not shown) of the adding pump 20 in the direction of double arrows 27, 28, 29. The pistons 24, 25, 26 and associated cylinders are accommodated in a housing 21 of the adding pump 20.

The adding pump 20 has an inlet 22 through which it can be supplied with an extinguishing agent additive. The inflow of the extinguishing agent additive thereby ensues in the direction of arrow 23 and thus parallel to the direction of movement 27, 28, 29 of the pistons 24, 25, 26.

This thus ensures that the extinguishing agent additive is not deflected when it enters the adding pump 20 at its inlet 22 to when it enters into the cylinders, whereby the extinguishing agent additive is only subjected to low flow resistance. This contributes to an improvement in the efficiency of the adding pump 20, and thus the entire adding system, particularly in the case of highly viscous extinguishing agent additives.

FIG. 2 also depicts an adding pump 20 of an adding system according to the fourth aspect of the invention. A relief valve 30 is arranged behind the inlet 22 of the adding pump 20 and still ahead of the cylinders with the pistons 24, 25, 26 which closes if the pressure of the extinguishing agent additive flowing into the adding pump 20 is too high and thereby protects the adding pump 20 from damage or even destruction. The relief valve 30 is integrated into the housing 21 of the adding pump 20, and in particular into its pump cover, and therefore requires no additional space.

LIST OF REFERENCE NUMERALS

1 water motor
2 water motor housing
3 water motor input
4 water motor output
5 drainage housing
6, 7 paddle
8 rotor body
9 rotor
10 working chamber
11 drainage housing inner wall
12, 13 through slots
14 input
15 output
16 output shaft
17 axis of rotation
20 adding pump
21 adding pump housing
22 adding pump inlet
23 direction of extinguishing agent additive flow
24, 25, 26 pistons
27, 28, 29 piston direction of movement
30 relief valve
31 input shaft
32 inlet
33 outlet
40 adding line
41 motor-side end
42 outlet-side end
50 extinguishing agent additive line
51 pump-side end
52 adding-line side end
60 admixture point

What is claimed is:

1. An adding system, comprising:

a motor able to be driven by a flow of an extinguishing agent, with an input for supplying the extinguishing agent to the motor, an output for discharging the extinguishing agent from the motor, and an output shaft able to be driven by the motor;

an adding pump for conveying an extinguishing agent additive which has an input shaft coupled to the output shaft of the motor, an inlet for providing the extinguishing agent additive, and an outlet for discharging the extinguishing agent additive;

an adding line having a first motor-side end and a second outlet-side end, wherein the first motor-side end is fluidly connected to the output of the motor; and an extinguishing agent additive line having a first pump-side end and a second adding line-side end, wherein the first pump-side end is fluidly connected to the outlet of the adding pump and the second adding line-side end is fluidly connected to the adding line at an admixture point, wherein the motor is a rotation motor in which a rotor is rotatably mounted in a drainage housing such that the rotor at least temporarily comes into contact with an inner side of the drainage housing, which forms an outer wall of a working chamber of the motor during its rotation, wherein the outer wall of the working chamber is at least partially in the shape of a logarithmic spiral in a cross section perpendicular to an axis of rotation of the rotor, wherein the rotor comprises a plurality of vane-shaped paddles inserted into radial slots in a rotor body of the rotor such that both ends of each paddle nearly touch the outer wall of the working chamber.

2. The adding system of claim 1, wherein the paddles have cutouts in their respective middle sections which ensure they do not collide with each other at their point of intersection on the rotational axis of the rotor.

* * * * *